June 21, 1932.    W. S. CROWELL    1,863,591
DENTAL PLASTIC COMPOSITION
Filed April 25, 1928
FIG. 1.
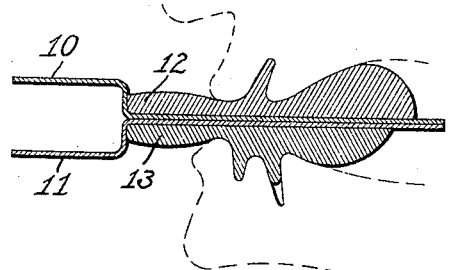
FIG. 2.
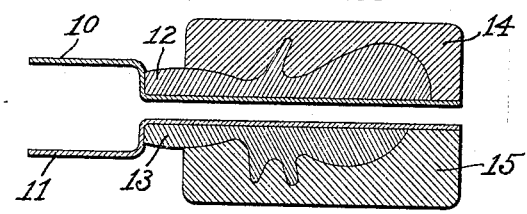
FIG. 3.
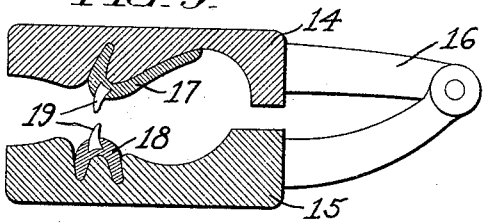
FIG. 4.
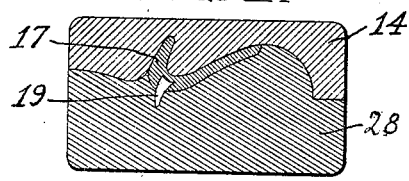
FIG. 5.
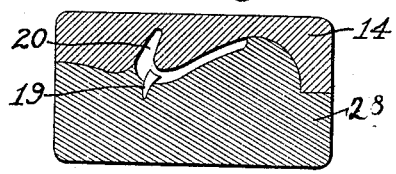
FIG. 6.
Inventor
Walter S. Crowell,
By Clifton C. Callowell
Attorney Patented June 21, 1932

1,863,591

UNITED STATES PATENT OFFICE

WALTER S. CROWELL, OF MELROSE PARK, PENNSYLVANIA, ASSIGNOR TO THE S. S. WHITE DENTAL MANUFACTURING COMPANY, A CORPORATION OF PENNSYLVANIA

DENTAL PLASTIC COMPOSITION

Application filed April 25, 1928. Serial No. 272,736.

This invention relates to improvements in compositions for molding dental plates.

The present practice in molding dental plates is to prepare an impression of the oral cavity by using plaster, modeling compound or the like material, which then has in intaglio the shape of the gums to be fitted with the plate. This intaglio impression is then filled with plaster or artificial stone to produce a positive or relief model which exactly corresponds to the shape of the gum and adjacent parts of the mouth. Usually the models are made for both upper and lower jaws. The models are hardened and mounted on an articulator, and matched porcelain teeth are located upon one or both models according as teeth are absent, by building up a replica of the desired dental plate or artificial denture in wax on each model around the teeth. These teeth are arranged and positioned carefully, the manufacturer being guided by the articulator mechanism so that the teeth are in the proper relation to each other and to the opposing teeth (present in the opposing model or being placed thereon when mating plates are being made), so that the wax replica including the teeth is correct both mechanically and artistically. The individual teeth are ground, if necessary, to establish proper fitting and articulation.

The plaster model with the wax replica and porcelain teeth thereon is then removed from the articulator and placed in a flask; and a composition poured over it to complete the casting mold. This part of the casting mold therefore has the artificial teeth embedded therein to the extent by which they have projected from the wax replica. The mold is hardened, and then the wax replica is removed, usually by being melted out. One part of the mold is formed by the model and exactly reproduces the gum, etc. to be fitted, while the other part provides a cavity exactly defining the shape and size of the denture plate, and the porcelain teeth for the denture extend from the latter part of the mold by the amount which is to be received within the plate to be formed.

The mold cavity is filled with the material of which the plate is to be made, such as hard rubber, celluloid, glyptal resin, cellulose acetate plastics, synthetic resins, etc. The parts of the mold are brought under pressure, and hardening operations are accomplished according to the material of which the plate is to be composed, such as vulcanizing, baking, etc.

In practice, however, it is found that although ordinary plaster of Paris produces excellent models for making rubber, celluloid or like plates which are cast and heated at temperatures below 100° C. under conditions in which water vapor or water may be present without deleterious effects, since some processes for such hardening involve the use of an atmosphere of steam or water vapor; and even available for use in vulcanizing operations at higher temperatures in the presence of such an atmosphere of steam: such mold compositions are not satisfactory for molding materials which require a higher temperature than 100° C. in the absence of moisture. With phenolic condensate resins, for example, the presence of moisture in the mould prevents the completion of the hardening reaction, causing blisters or roughening of the surface and at times producing actual cavities in the plate, so that moisture must be very carefully excluded from the interior of the moulds when such resins are used. With glycerol-phthalic acid, or glyptal resins the presence of moisture within the mould during pressing and hardening causes similar defects and in many instances, owing to the high temperatures used, hydrolizes and completely destroys the resin.

In such cases it is usually found advantageous to press and harden the resins in the absence of moisture, baking or drying the mould before introducing the resin into it. When the plaster is heated to about 100° C. however, it tends to lose water of crystallization so that its strength is greatly diminished. On the other hand, if the plate is not properly dried, the aforesaid difficulties as to the finish of the plate arise. Accompanying the loss of water of crystallization from the plaster is a far more serious phenomenon, being the shrinkage and contraction of the mold.

This shrinkage reduces the size of the mold and therefore of the denture made in it, in all directions. Cracking and unevenness may occur, and by reason of the necessarily irregular shape of the plates, distortion is oftentimes present. The completed denture plate then fits the mouth for which it was made very poorly, being tight and causing pain and discomfort; even the arrangement of the teeth may be disturbed. It is usually necessary to correct such shrinkage, distortions and disarrangements by an excessive amount of grinding. Hence, it is very difficult to prepare a finished plate, ready for the mouth, from a plastic material which requires a temperature of 100° C. or above for its proper solidification, unless by reason of the nature of the material for the dental plate, the hardening of such material may be accomplished in an atmosphere of steam or water vapor or in the presence of water. To adjust the plate requires a great deal of grinding and dressing by a skillful dentist in order to correct the errors arising in the laboratory by reason of such shrinkage, etc.

It is therefore an object of this invention to provide a mold and a composition for forming molds which are not subject to such shrinkage when heated to temperatures above 100° C. in an atmosphere free from water, when necessary for casting and hardening the plate material, so that by the improved composition a denture plate may be made which is an exact reproduction in size, arrangement, and shape, of the wax replica which has been constructed upon the model.

For the purpose of explaining one employment of dental molds made according to the present invention, there is illustrated on the drawing, by the successive steps, the method of preparing a dental plate with artificial porcelain teeth embedded therein, in Figs. 1 to 6 inclusive.

Although the first three figures show the preparation for both the upper and lower jaws and plates, the description will be detailed with respect to the preparation of the upper plate only: and it will be understood that similar methods are employed to complete the lower plate.

In Fig. 1, the trays 10, 11 are each provided with a mass 12 or 13 of the moistened dental plate composition according to the present invention, the mass being judiciously distributed upon the respective trays to occupy approximately the shape of the patient's mouth. The patient is then caused to "bite" into the mass so that the impression is taken as indicated in Fig. 1. This biting is usually permitted to continue until the composition has stiffened so that it no longer is subject to easy deformation.

The impression trays are then removed from the mouth and the composition permitted to definitely harden. A model 14 of plaster of Paris or the like cement which sets in the cold by reason of chemical action is then formed by treating the impression to prevent absorption and sticking, and then casting dental plaster over the impression, as shown by Fig. 2.

The models 14 and 15 are then mounted on an articulator 16 (Fig. 3), after the impression has been removed. Since this impression is no longer useful, it may be broken in removing from the model. The two models 14 and 15 on the articulator 16 then should accurately represent the patient's mouth with respect to the shaping of the gums, lips, palate, etc. Upon these models are then built up in wax the replicas 17 and 18 of the upper and lower plates, the porcelain teeth 19 being mounted thereon as the work progresses, these replicas and teeth being carved and arranged until the effect obtained is that which is desired in the finished dental plate. The model 14 with the replica 17 thereon is then similarly treated to prevent absorption and sticking, and a countermold 28 prepared. It will be noted that the countermold differs from the impression obtained in Fig. 1 by the presence of the replica 17 and the teeth 19. The relative shaping of these parts is represented in Fig. 4.

The countermold and model may then be separated if desired for the withdrawal of the wax of the replica 17: or in some instances where a casting operation is employed, a gate may be formed either in the model or the countermold and the wax replica removed by heating. In either event, when the model and countermold are in position for shaping the plate (Fig. 5), the teeth 19 are located in the countermold 28 and are thus held in their desired relationship with respect to the cavity 20. This cavity is then filled with the material of which the plate is to be composed, such as rubber composition, synthetic resin, etc., this mass being forced into position and of proper volume to fill the cavity 20. The model and countermold are then clamped together in a heating device and heated so that the contents are vulcanized or hardened.

The model and countermold are then separated, and if necessary are broken in order to remove the final plate 21 shown in Fig. 6 which has the teeth 19 firmly embedded therein in the positions and arrangement predetermined on the articulator 16 in the step of Fig. 3.

It will be noted that in order to avoid resetting of the final plate, it is necessary that the impression, model and countermold shall accurately reproduce the conformation of the mouth and the conformation given the exposed surface of the plate during the articulating step of Fig. 3. In particular, this necessity is made difficult by shrinkage of the material employed for these parts.

This end is accomplished according to the present invention by a composition which is not subject to such shrinkage; for example, by mixing with the ordinary plaster a material which forms a sort of skeleton with the mold. Furthermore, it is preferred to employ a material which has a positive coefficient of thermal expansion, as opposed to the negative coefficient of thermal expansion of the plaster itself under the conditions set forth above.

In this way, the mass tends to retain its size and shape, irrespective of temperature, and hence the dental plates prepared from such a mass are exactly of the desired dimensions.

Various materials have been found competent for the purpose. The preferred materials are granulated or shotted metals such as tin, lead, zinc, copper or iron; but excellent results have been obtained by using sand, crushed quartz and the like. Materials in the form of rounded granules appear to give a smoother finish to the work than those having angular granules, and less after-treatment for finishing is required. The low surface area of such rounded granules requires a relatively small quantity of water for wetting them to secure the proper adhesion of the binding cement; and hence the total quantity of water employed is reduced. Such materials are preferably inert with respect to the plaster or other binder under the conditions of temperature employed.

The size of the granules is selected according to the material and the result to be attained. The maximum size of the granules is dictated by the finish desired on the piece to be manufactured.

The minimum size of the granules depends somewhat on the filling material employed. If the material is in a very finely divided form, a greater quantity of water is required for mixing, and in some cases the amount of water is excessive, and the mold after drying and hardening becomes friable or chalky, and lacking in sufficient strength; such a condition usually indicates that a larger size of granule should be selected. It is found that apparently the best results are obtained by using materials which pass a twenty-mesh sieve, and not more than 10% of which will pass a two-hundred mesh sieve. In substance, therefore, the granules are between twenty and two-hundred mesh in size. It will be understood that by a "twenty mesh" screen, for example, is meant a screen having twenty meshes to the linear inch.

It is found that the proportions of filler and binder employed may be varied within certain limits without noticeably influencing the results. If too little binder is employed, the mold lacks strength and crushes easily; if too much binder is employed, shrinkage occurs. The best proportions to use appear to lie between 50 and 80% by volume of plaster as a binder and 50 to 20% by volume of added filler. The proportions are stated in the form of volume, owing to the widely ranging specific gravities of the added materials.

The added material or filler reduces the shrinkage by reducing the volume of shrinkable material; it also forms a non-shrinking skeleton or network throughout the mass, thereby localizing the shrinkage to the voids or interstices between the granules. Certain of these added materials themselves, such as metals, expand when heated and thus counteract the shrinkage of the binder proper.

It is obvious that the invention is not limited to the specific material stated; but that it may be employed in many ways within the scope of the appended claims.

What I claim as new and desire to secure by Letters Patent is:

1. A mold forming composition comprising 20 to 50% by volume of rounded particles of a heat resisting solid having a positive coefficient of thermal expansion and having a small surface area and varying in size and being smaller than 20 mesh but not more than substantially 10% of the same being smaller than 200 mesh, and 80 to 50% by volume of a binding cement which sets in the cold by reason of chemical action.

2. A mold competent to withstand heating to above 100° C. without distortion or becoming chalky, comprising an intimate mixture of rounded particles of solid material having small superficial area and varying in size and being smaller than 20 mesh but not more than substantially 10% of the same being smaller than 200 mesh, and a cold hardening binding cement.

3. A mold forming composition comprising 20 to 50% by volume of particles of matter of such form as to afford a low surface area, and 80 to 50% by volume of a binding cement which sets in the cold by reason of chemical action.

4. A mold formed of a composition comprising particles of matter of a form affording substantially a minimum surface area, and a binding cement formed of particles of a consistency closely resembling dust, the respective particles widely differing in size.

In witness whereof, I have hereunto set my hand this 23rd day of April, A. D. 1928.

WALTER S. CROWELL.